United States Patent [19]

Koch et al.

[11] 4,018,537

[45] Apr. 19, 1977

[54] OPERATING HANDLE

[75] Inventors: Ulrich H. Koch; Stephen Matousek, both of Moraga; Richard S. DiGennaro, Berkeley, all of Calif.

[73] Assignee: Whitey Research Tool Co., Emeryville, Calif.

[22] Filed: May 15, 1975

[21] Appl. No.: 577,776

[52] U.S. Cl. .............................. 403/240; 403/259; 16/117; 74/552

[51] Int. Cl.² ........................................ F16B 2/00

[58] Field of Search ............... 16/117; 74/552, 553; 403/259, 261, 260, 240, 374

[56] References Cited

UNITED STATES PATENTS

| | | | |
|---|---|---|---|
| 851,591 | 4/1907 | Forg | 74/552 |
| 1,982,011 | 11/1934 | Michel | 16/117 |
| 2,577,838 | 11/1951 | Baldwin, Jr. | 16/121 |
| 2,858,152 | 10/1958 | Rifner | 403/377 |
| 3,012,799 | 12/1961 | Mayne | 403/377 |

FOREIGN PATENTS OR APPLICATIONS

| | | | |
|---|---|---|---|
| 631,280 | 11/1961 | Canada | 403/261 |
| 465,375 | 8/1951 | Italy | 403/259 |

Primary Examiner—Andrew V. Kundrat
Attorney, Agent, or Firm—Fay & Sharpe

[57] ABSTRACT

An operating handle comprising a sheet metal stamping or the like which includes means for providing a clamping force against an operating member when the handle is mounted thereon. The handle structure is comprised of separate handle and biasing members which each include a mounting opening through which the operating member is received. The handle and biasing members are shaped and dimensioned such that as a conventional handle nut is threadedly advanced on the operating member to force these members toward each other, the mounting openings in the members are biased in opposite directions from each other to place a clamping force against opposite sides of the operating member. The biasing member may also conveniently include stops or tabs adapted to cooperate with stops on a valve body or the like to precisely define the extreme positions to which the handle and operating member may be rotated.

21 Claims, 8 Drawing Figures

OPERATING HANDLE

BACKGROUND OF THE INVENTION

This invention pertains to the art of handles and more particularly to operating handles.

The invention is particularly applicable to a two piece safety handle and will be described with particular reference to its use on a ball valve; however, it will be appreciated by those skilled in the art that the invention has broader applications and may be advantageously employed in any number of different environments which require operating handles.

Ball valves have traditionally employed what may be termed as lever handles. These handles are simple to make, easy to turn and clearly define the off-on positions of the valve. However, in some installations such as chemical plants, there has been a fear of accidents caused by someone catching his clothing on a valve handle and inadvertently actuating it. Such accidents can substantially upset or even cause an entire shutdown in plant operations as well as subject plant personnel who may be working on an opened system downstream from the valve to serious injury. To overcome these problems, safety handles have been variously required by safety legislative and/or enforcement agencies. Such safety handles are required to be round or oval with all corners well rounded so that a sleeve or similar article of clothing will slip off the handle rather than catch thereon. In addition, safety handles must also include some means of showing valve position, that is, valve opened and closed positions.

Various types and designs of prior safety and conventional handles have been of a one-piece construction and included a mounting opening or hole therethrough in order that the handle could be conveniently mounted to a valve operating stem. Some prior valves have included opposed flats adjacent the outermost end of the stem for purposes of closely receiving a handle and for preventing a loose or sloppy fit between the stem and handle. With prior handles, it has been necessary to maintain the hole size tolerances very close to the stem flat width. Even with extremely close tolerances, however, there is still some clearance between the hole and the stem. Thus, after a few cycles of operation, the corners of the stem flats become rounded so that there was noticeable slop in the handle-stem fit. Such arrangements are extremely undesirable in valving situations.

BRIEF DESCRIPTION OF THE PRESENT INVENTION

The present invention contemplates a new and improved article which overcomes the foregoing problems and others and provides a new operating handle which is simple, economical, meets the requirements for safety valve handles, prevents loose or sloppy fits between the handle and operating members and which is readily adaptable for use with any number of environments which require a handle to rotate an operating member.

In accordance with the present invention, there is provided and operating handle assembly adapted to be tightly received on an operating member when the handle is mounted thereon. Accordingly, the operating handle comprises a handle member including a first handle mounting opening disposed therein adapted to be received over the operating member. The handle also includes a biasing member having a second mounting opening disposed therein and adapted to be received over the operating member. The biasing member and handle member cooperate with each other so that as these two members are forced axially toward each other on an operating member, the opposite sides of the first and second mounting openings are forced toward each other to apply opposed radial clamping forces against opposite sides of the operating member.

In accordance with a limited aspect of the present invention, the handle member includes an area thereon for cooperating with the biasing member in establishing the opposed radial clamping forces.

In accordance with another limited aspect of the present invention, the handle member includes a base portion which has the first handle mounting opening disposed therein. A handle portion is connected to the base with the area of interconnection connection between the two defining a biasing zone. The biasing member includes a biasing leg extending from the second mounting opening toward the biasing zone of the handle member and the length of the leg is slightly greater than the distance between the first mounting opening and the biasing zone.

In accordance with still another aspect of the present invention, the handle member includes a recess area therein with the biasing member being received in the recess and acting against a portion of the side wall thereof to achieve the opposed radial clamping forces.

In accordance with yet a further aspect of the present invention, the biasing member includes handle tabs adapted to cooperate with stop members for precisely determining the extreme positions for rotational movement of the operating handle.

The principal object of the present invention is the provision of a new operating handle which is simple and economical to manufacture.

Another object of the present invention is the provision of a new operating handle which eliminates a loose or sloppy fit between an operating member and the handle itself.

Still another object of the present invention is the provision of a new operating handle which includes means for precisely defining the extreme positions for rotation of the handle and an associated operating member is attached.

Still another object of the present invention is the provision of a new operating handle which is readily adapted to use in any number of operational environments where operating handles are conveniently employed.

BRIEF DESCRIPTION OF THE FIGURES

The invention may take physical form in certain parts and arrangements of parts, a preferred embodiment of which will be described in detail in the specification and illustrated in the accompanying drawings which form a part hereof and wherein.

DETAILED DESCRIPTION OF THE PREFERRED EMBODIMENT

Figure 1:
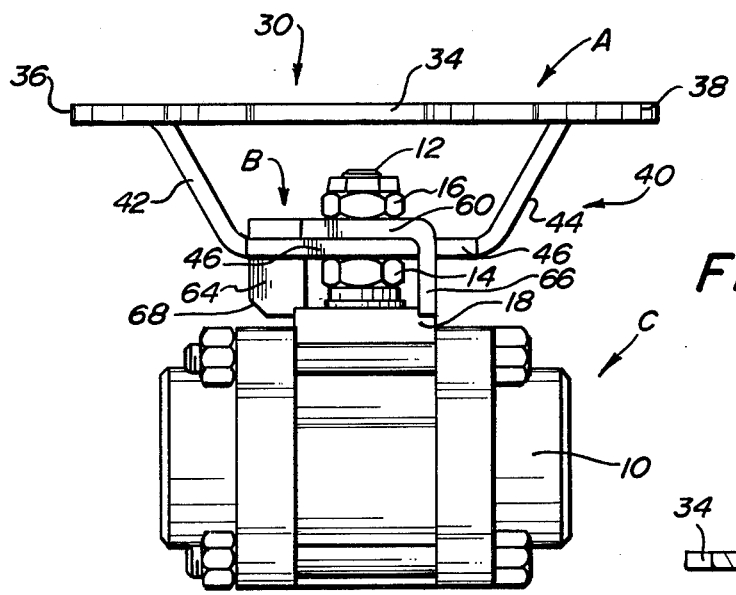
FIG. 1 is a side elevational view showing the concepts of the subject invention as applied to an operating handle for a conventional ball valve.
Figure 3:
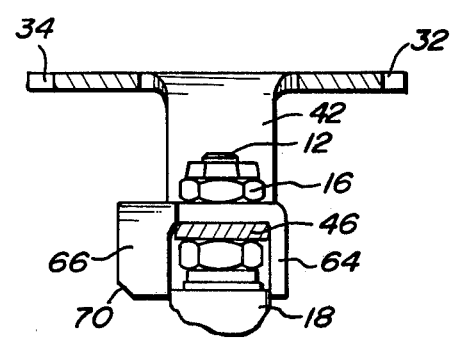
FIG. 3 is a cross-sectional view of the handle taken along lines 3—3 of FIG. 2.
Figure 2:
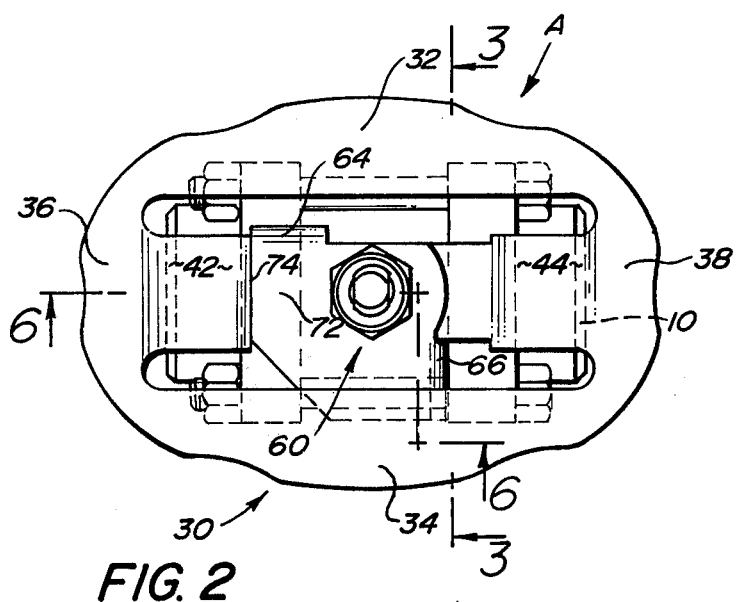
FIG. 2 is a plan view of the arrangement shown in FIG. 1.
Figure 4:
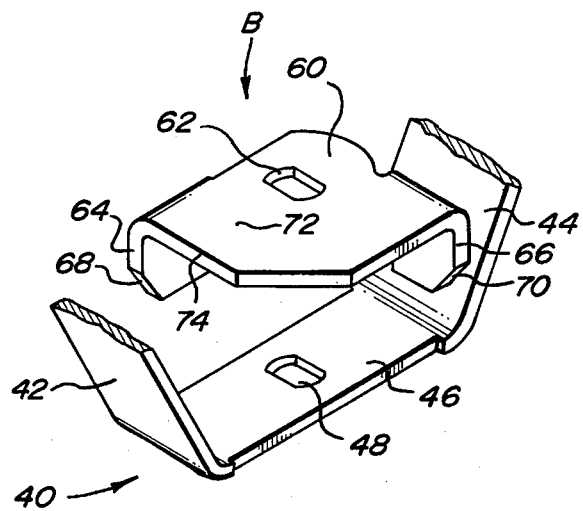
FIG. 4 is an exploded perspective view showing the arrangement between the biasing member and the valve handle web.

Referring now to the drawings wherein the showings are for purposes of illustrating the preferred embodiment of the invention only and not for purposes of limiting same, the FIGURES show a safety operating handle A and a biasing member in operative communication with each other on a valve C.

Valve C is shown for purposes of illustrating the invention only and could comprise any valve, however, as disclosed herein, this valve comprises a ball valve 10 having a valve operating stem 12 protruding outwardly from the valve body. It should be appreciated that the concepts of the subject invention are not limited to use on valves but may be equally employed on any mechanisms which require similar operation, i.e., a handle to turn an operating member. A packing nut 14 and a handle nut 16 are threadedly received on the valve operating stem with valve safety handle A and biasing member B tightly disposed between nuts 14,16. The general type of valve structure just defined in deemed conventional and known in the art so that further elaboration thereon is deemed unnecessary. In the valve shown in FIG. 1, a longitudinal rib 18 extends upwardly from the top surface of the valve body. This rib defines stops for purposes of determining the extreme points of rotation for the handle as will be described in greater detail hereinafter.

With reference to FIGS. 1–4, safety operating handle A is shown as having a generally oval shaped handle portion generally designated 30. This handle portion includes opposed sides 32,34 and opposed ends 36,38. The outer edge of the sides and ends are essentially arcuate and are dimensioned so as to provide a generally oval overall configuration. Sides and ends 32,34,36 and 38 define a gripping portion or area and may include a rippled configuration as shown in the FIGURES to facilitate a good hand hold on the handle.

Depending downwardly from handle portion 30 at opposed ends 36,38 is a central web portion generally designated 40. This web is comprised of opposed angularly downward depending connecting legs 42,44 which converge toward each other, intercept and are connected to a base portion 46. The areas of interconnection between legs 42,44 and base 46 define biasing zones. While it is possible to use any number of angles, the preferred embodiment of the present invention contemplates an included angle of about 60° between connecting legs 42,44. Generally centrally disposed in base 46 is a slightly elongated mounting opening 48 to accommodate mounting of the handle member onto valve operating stem 12.

Mounting opening 48 is transversely elongated relative to base 46 and includes opposed arcuate end walls and opposed straight side walls. These side walls are adapted to be relatively closely received on adjacent opposed flats on the valve operating stem to prevent relative rotation between the handle and the operating stem itself. This type of configuration, including the stem flats, is deemed to be known in the art so that further elaboration thereon should not be necessary.

In the preferred embodiment of the present invention, it is contemplated that safety operating handle A will comprise a one-piece sheet metal stamping to maintain production costs at a minimum. For aesthetic and additional safety purposes, it is also contemplated that at least handle portion 30 may be covered with a vinyl plastic or other insulative material to a preferred thickness of approximately 1/16. inch. Also by varying the color of the vinyl coating from valve to valve in a complex system, each valve may be coded to indicate what fluid it controls. However, as will become apparent, handle A may be constructed from any number of other materials using other manufacturing techniques without departing from the intent or scope of the present invention.

Biasing member B is comprised of a base portion generally designated 60 having an elongated mounting opening 62 disposed therein. Mounting opening 62 is substantially identical to mounting opening 48 as hereinabove previously discussed. Depending downwardly from base 60 are a pair of handle stops or tabs generally designated 64,66, each having an angled or beveled lower corner 68,70 respectively. In the arrangement here under discussion, stops or tabs 64,66 merely comprise bent members formed integrally with base 60 disposed such that handle A will be limited to 90° of rotation before one of tabs 64,66 engages a portion of the valve body or cooperative stops disposed thereon as will be described in greater detail hereinafter. While the lines of bend between tabs 64,66 as shown in the FIGURES are normal to each other, it should be appreciated that these lines may be located on base 60 at other positions relative to one another to accommodate other valve designs or alternate uses of the handle or may be eliminated altogether.

Base portion 60 further includes a biasing leg portion generally designated 72 which generally comprises that portion of base 60 extending between mounting opening 62 and outermost or end edge 74. Biasing leg portion 72 is principally employed to achieve the desired clamping arrangement between opposite sides of openings 48,62 and operating stem 12 as will be described in greater detail hereinafter. As with handle A, biasing member B is also advantageously comprised of a sheet metal stamping. The specifics of the biasing member design as shown in the FIGURES may be varied as deemed necessary or appropriate to accommodate different uses of the subject new handle. Similar to handle A, biasing member B may be constructed from other materials using alternative techniques if desired.

Figure 5:
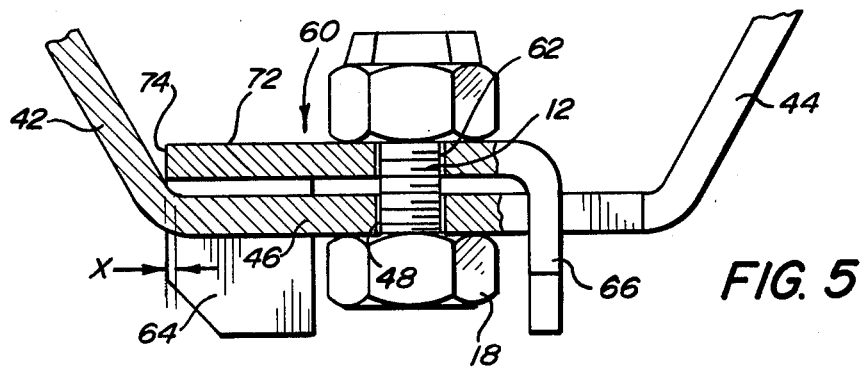
FIG. 5 is a cross-sectional view taken along lines 5—5 of FIG. 2 showing initial positioning of the biasing member and handle on a valve operating member.
Figure 6:
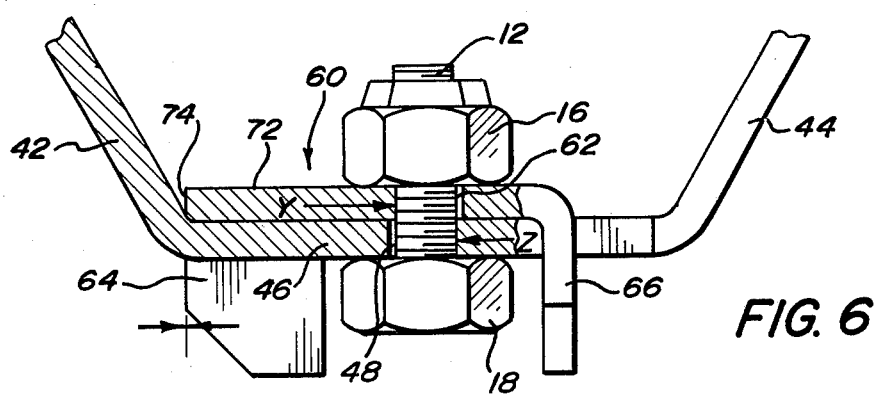
FIG. 6 is a cross-sectional view identical to FIG. 5 showing the biasing member and handle in their final relative positions.

Use of the above described handle and biasing member arrangement on a typical ball valve will now be made with particular reference to FIGS. 1, 5 and 6. As the handle and biasing members are each positioned on operating stem 12 through openings 48,62, respectively and with base 46 resting on packing nut 14, it will be seen in FIG. 5 that body 60 and base 46 are in a spaced apart relationship when openings 48,62 are in alignment with each other and with outermost edge 74 of base 60 resting against connecting leg 42. As will be noted, the distance between mounting opening 62 and edge 74, that is, the length of biasing leg portion 72 is slightly greater than the distance between mounting opening 48 and the biasing zone defined by the interconnection between connecting leg 42 and base 46. This differential dimension or distance comprises an over size or interference dimension generally designated X in FIG. 5. While the exact amount of the over size or interference dimension X may be varied, it is contemplated in the preferred embodiment of the invention that the same will vary between zero and .016.

As handle nut 16 is threadedly advanced on stem 12 against base portion 60 of biasing member B, edge 74 will be biased against angularly disposed connecting leg 42 so that calculating misalignment will occur between openings 48,62. In FIG. 6, handle nut 16 is shown as having been advanced to a position where operating handle A and biasing member B are closely clamped between nuts 14,16. As base portion 60 of the biasing member is forced toward base 46 of the operating handle by advancement of nut 16, the angular disposition of connecting leg 42 causes forced misalignment between openings 48,62. In this manner, one side of opening 62 exerts a clamping force against the flat area on one side of operating stem 12 and the opposite side of opening 48 exerts a clamping force against the flat area on the opposite side of operating stem 12. These two forces are respectively shown by arrows Y and Z in FIG. 6. In this manner, the subject invention is deemed to add a new dimension to the mounting of operating handles on valves or other structures where, in addition to the close fitting relationship between the handle mounting hole and the operating stem as well as the compressive force exerted against the handle by the handle nut, radial clamping forces are exerted against opposite sides of the operating stem.

On a typical ball valve for which description of the subject invention has been made with reference to FIGS. 1–6, stops or tabs 64,66 on biasing member B provide means whereby extreme movement of the handle is precisely limited to define fully opened and fully closed valve conditions. When the valve is in an opened condition, the longitudinal axis of handle portion 30 will extend longitudinally of the valve as shown in the FIGURES with stop or tab 66 positively engaging rib 18 which, in the particular ball valve shown, is included as an integral part of the valve body. Of course, other types of stop arrangements which are made a part of the valve body can also be employed. To move the valve to a closed condition, handle portion 30 is rotated clockwise in the view of FIG. 2 until stop or tab 64 engages rib 18 on the opposite side thereof engaged by stop or tab 66 when the valve is in an opened condition. Stops or tabs 64,66 are disposed on base 62 such that when either of the tabs is in engagement with rib 18, any forces exerted on the tabs are generally parallel to the downward bend areas to avoid undesired and inadvertent unbending or flexing of the tabs toward the plane of base portion 60. Thus, positively controlled fully opened and fully closed conditions of ball valve 10 is assured through these stops. The stem flats and the particular configuration of mounting openings 48,62 assure that the handle will not be installed improperly with respect to conventional and accepted ball valve handle installations although the handle and biasing members may be rotated 180° as may be desired. A visual designation for the opened and closed conditions of the valve may be included as, for example, by die stamping an appropriate designation on base portion 60 of biasing member B. In addition, central web portion 40 may also act as a visual indicator of the valve positioning or fluid flow. This type of indicator is deemed advantageous from the standpoint that it is readily viewed regardless of the mounted position of the valve, for example, an overhead mounting.

Again, it should be appreciated, as mentioned previously, that the subject invention may be employed on operating handle designs other than the specific one hereinabove described for use not only on other valve designs but all types of other equipment as well. For example, and with valves of the type having operating stems which are rotated several times between the fully opened and fully closed conditions, it is entirely possible to eliminate stops or tabs 64,66 from base portion 60 of a biasing member B and simply provide for the inclusion of an appropriate biasing leg portion 72 as described above. Likewise, the biasing member aspects of the subject invention are readily adaptable to other handle types, as for example, the more conventional lever handles having a single connecting leg connecting a handle portion and a base portion. In this regard, it is merely a primary requisite when applying the subject inventive concepts to this type of arrangement that side edge 74 of biasing leg portion 72 have an area on the handle on which to act whereby through the action of handle nut 16, mounting openings 48,62 may be moved to misaligned positions for purposes of placing opposed radial clamping forces against an operating stem or member.

While other handle designs may be used, the generally oval configuration of handle portion 30 described above is deemed to be advantageous from the standpoint of safety. That is, the handle configuration eliminates concern over inadvertent opening and/or closing of a valve by, for example, workmen or plant personnel catching their clothing on the handle. This has been a problem heretofore when more conventional lever handles have been employed on valve sizes of 1 or smaller. Such safety handles are now required by safety enforcement agencies in many applications, plants or facilities. In addition to the safety aspects, the generally oval valve handle disclosed is easy and inexpensive to manufacture and lends itself to be manufactured as a sheet metal stamping.

Figure 7:
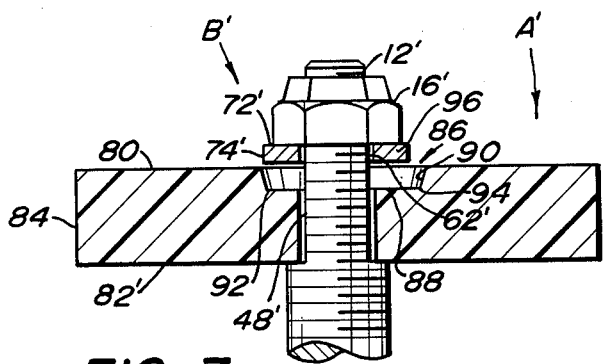
FIG. 7 is a partial side view in cross-section showing an alternative arrangement for practicing the concepts of the subject invention; and, FIG. 8 is a partial side view in cross-section showing still another alternative arrangement for practicing the concepts of the subject invention.
Figure 8:
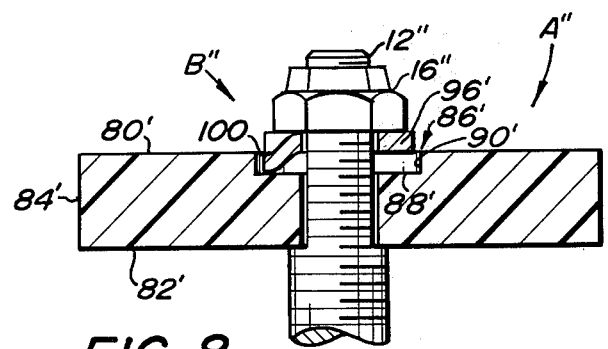

FIGS. 7 and 8 show two alternative arrangements for practicing the concepts of the subject invention. In these two arrangements, however, the biasing zone is incorporated directly into the handle member itself. For ease of illustration in appreciating the structure herein involved, like components have like numerals including a prime (') or double prime (") suffix and new components have new numerals.

In FIG. 7, there is shown an operating handle A' having a top wall 80, a bottom wall 82 and a peripheral side wall 84. This handle may be constructed from any convenient material and in the FIGURE, this material is shown as being plastic. However, machined or cast metal handles could also be used. The configuration of peripheral side wall 84 may vary as desired or deemed necessary. Mounting opening 48' extends through the handle between walls 80,82 and is employed to locate the handle on operating member 12'. Extending inwardly from wall 80 is a recessed or counterbored area generally designated 86 having a generally flat bottom wall 88 and a continuous inwardly beveled side wall 90. Recess 86 is eccentrically disposed relative to opening 48' for reasons that will become apparent hereinafter.

Area 92 is disposed closer to first opening 48' than is area 94 in order to effectively cooperate with the biasing member. In the FIG. 7 arrangement, biasing member B' comprises a flat washer element 96 having a second mounting opening 62' extending therethrough. Here, the distance between opening 62' and the outermost peripheral edge 74' comprises a biasing leg 72'. This leg, of course, extends completely around the washer. As with the FIGS. 1–6 embodiment, the length of leg 72' is slightly greater than the distance between mounting opening 48' and the biasing zone defined at area 92. This differential in dimension and its operation is substantially as discussed with reference to FIG. 1–6 so further elaboration thereon is not deemed necessary. The eccentric positioning of recess or counterbore 86 provides clearance between area 94 and the washer in order that the assembly may properly function.

Accordingly, as handle nut 16' is threadedly advanced along operating member 12', the same biasing action between handle members A' and biasing member B' is received as has been discussed hereinabove in detail. That is, cooperation between these two components acts to place opposed radial clamping forces against operating member 12'.

FIG. 8 shows a slight modification of the FIG. 7 alternative embodiment. Here, recess or counterbore 86' has a straight side wall 90'. Because of the specific configuration of biasing member B'', it is possible to concentrically locate area 86', although it will preferably have a slightly greater diameter than area 86 in FIG. 7 in order to provide the necessary and appropriate clearance area.

In this arrangement, washer 96' includes a downwardly depending tab area 100. The washer may be of any shape but is at least thin enough to act as a flexible spring lock. Tab 100 is bent downwardly and has a configuration such that when handle nut 16'' is threadedly advanced along operating member 12'' to clamp the washer tightly to the handle members, tab 100 flexes to a flattened condition. As the tab is so flexed, its effective length increases so that it engages side wall 90'' to cause the washer and handle to exert the desired opposed radial clamping forces against operating member 12''.

It would also be possible in the FIG. 7 and 8 alternative embodiments to form or include a ring-like area protruding outwardly from top walls 80,80' respectively in place of the counterbored areas 86,86'. The inner side wall configurations of such ring-like areas could conform to those shown in FIGS. 7 and 8 so that use and operation of these alternatives would be the same as already discussed hereinabove.

The invention has been described with reference to the preferred embodiment. Obviously, modifications and alterations in addition to those specifically discussed will occur to others upon the reading and understanding of the specification. It is our intention to include all such modifications and alterations insofar as they come within the scope of the appended claims or the equivalents thereof.

Having thus described our invention, we now claim:

1. An operating handle assembly adapted to be tightly mounted on an operating member, said operating handle comprising:
a handle member having a first handle mounting opening disposed therein adapted to be received over said operating member; and,
a biasing member including a second mounting opening disposed therein adapted to be received over said operating member in close spaced association with said handle member, said handle and biasing members including cooperating means for forcing opposite sides of said first and second mounting openings toward each other generally axially of said operating member whereby opposed radial clamping forces are applied to opposite sides of said operating member, said biasing member further including handle stops for precisely limiting rotational movement of said operating handle and said operating member.

2. The operating handle as defined in claim 1 wherein said handle stops comprise downwardly depending spaced apart integral tabs adapted to engage positive stop members for precisely limiting arcuate movement of said operating handle between two extreme positions.

3. An operating handle assembly adapted to be tightly mounted on an operating member, said operating handle comprising:
a handle member having a first handle mounting opening disposed therein adapted to be received over said operating member; and,
a biasing member including a second mounting opening disposed therein adapted to be received over said operating member in close spaced association with said handle member, said handle and biasing members including cooperating means for forcing opposite sides of said first and second mounting openings toward each other as said handle and biasing members are moved toward each other generally axially of said operating member whereby opposed radial clamping forces are applied to opposite sides of said operating member, and first and second mounting openings further including means for cooperating with said operating member to prevent relative rotation between said handle and said biasing member and said operating member.

4. The operating handle as defined in claim 3 wherein said force means is disposed on said handle member, said biasing member including an area thereon for engaging said force means.

5. The operating handle as defined in claim 3 wherein said handle member includes a base portion having said first mounting opening disposed therein and a handle portion connected to said base, portion the area of interconnection between said handle and base portions defining a biasing zone which comprises said force means, said biasing member being disposed on the same side of said base portion as said biasing zone and including a biasing leg extending between said second mounting opening and said biasing zone, the length of said biasing leg from said second mounting opening being slightly greater than the distance between said first mounting opening and said biasing zone.

6. The operating handle as defined in claim 3 wherein said handle member includes a recessed area therein having a side wall, said biasing member being received in said recess and acting against at least a portion of said side wall as said handle and biasing members are brought toward engagement with each other.

7. The operating handle as defined in claim 6 wherein the at least a portion of said side wall is tapered inwardly from the outer surface of said handle member and defining a biasing zone which comprises said force means, said biasing member including at least a portion thereof where the length from said second mounting hole to the outer edge is slightly greater than the distance between said first mounting and said biasing zone.

8. The operating handle as defined in claim 6 wherein said recessed area comprises a counterbored area disposed generally about said first mounting opening, said biasing member having at least a portion thereof engaging the side wall of said counterbore as said handle and biasing members are brought toward engagement with each other and then applying a biasing force against said side wall as said handle and biasing members are brought further toward engagement with each other.

9. An operating handle assembly adapted to be tightly mounted on an operating member, said operating handle comprising:
  a handle member including a base portion having a first handle mounting opening disposed therein adapted to be received over said operating member and a handle portion connected to said base portion by at least one connecting leg depending downwardly from said handle portion with the interconnection between said at least one connecting leg and said base portion defining a biasing zone;
  a biasing member including a second mounting opening disposed therein adapted to be received over said operating member in close association with said handle member base portion and on the same side thereof as said biasing zone, said biasing member having a biasing leg extending between said second mounting opening and said biasing zone with the length of said biasing leg from said second mounting opening being slightly greater than the distance between said first mounting opening and said biasing zone, the opposite sides of said first and second mounting openings being forced toward each other as said handle and biasing member are forcibly moved toward each other generally axially of said operating member whereby opposed radial clamping forces are applied to opposite sides of said operating member.

10. The operating handle as defined in claim 9 wherein said handle portion includes a generally oval gripping portion and has a pair of downwardly depending connecting legs.

11. The operating handle as defined in claim 10 wherein said connecting legs depend downwardly from adjacent the opposite ends of said generally oval gripping portion and converge toward said base portion at an included angle between said legs of approximately 60°.

12. An operating handle assembly adapted to be tightly mounted on an operating member, said operating member comprising:
  a handle member having a first handle mounting opening disposed therein adapted to be received over said operating member and a counterbored area having an inwardly tapering side wall with a portion thereof defining a biasing zone and a generally flat bottom wall, said counterbored area being disposed generally eccentrically around said first mounting opening with that portion of said side wall spaced closest to said first mounting opening comprising said biasing zone;
  a biasing member received in said counterbored area and including a second mounting opening disposed therein adapted to be received over said operating member, said biasing member including at least a portion thereof where the length from said second mounting opening to the outer edge is slightly greater than the distance between said first mounting opening and said biasing zone, the opposite sides of said first and second mounting openings being forced toward each other as said handle and biasing members are forcibly moved toward each other generally axially of said operating member whereby opposed radial clamping forces are applied to opposite sides of said operating member.

13. The operating handle as defined in claim 12 wherein said biasing member comprises a generally flat annular washer.

14. An operating handle assembly adapted to be tightly mounted on an operating member, said operating handle comprising:
  a handle member having a first handle opening disposed therein adapted to be received over said operating member and a counterbored area disposed generally about said first mounting opening and having a side wall;
  a biasing member received in said counterbored area and including a second mounting opening disposed therein adapted to be received over said operating member with at least a portion of said biasing member comprising a downwardly and outwardly depending tab-like member, said biasing member having at least a portion thereof engaging the side wall of said counterbored area as said handle and biasing members are forcibly moved toward engagement with each other and then applying a biasing force against said side wall as said handle and biasing members are forcibly moved further toward engagement with each other whereby opposed radial clamping forces are applied to opposite sides of said operating member.

15. The operating handle as defined in claim 14 wherein said biasing member is constructed from a resilient material whereby said tab-like member may be resiliently deformed to extend outwardly from the rest of said biasing member to engage the side wall of said counterbore as said biasing member is brought toward engagement with said handle member.

16. An operating handle assembly closely received on a valve operating stem for rotatably moving said stem between first and second positions, said operating handle comprising:
  a handle member including a base portion having a first handle mounting opening disposed therein and adapted to be received over said stem and a handle portion connected to said base portion by at least one connecting leg depending downwardly from said handle portion with the interconnection between said at least one connecting leg and said base portion defining a biasing zone;
  a biasing member including a second mounting opening disposed therein adapted to be received over said stem in close spaced association with said handle member base portion on the same side thereof as said biasing zone, said biasing member having a biasing leg extending between said second mounting opening and said biasing zone with the length of said biasing leg from said second mounting opening being slightly greater than the distance between said first mounting opening and said biasing zone, the opposite sides of said first and second mounting openings being forced toward each other as said handle and biasing members are forcibly moved toward each other generally axially of said operating member whereby opposed radial clamping forces are applied to opposite sides of said stem; and, a clamping member received on said stem and selectively movable axially therealong for forcibly moving said handle and biasing members toward engagement with each other.

17. An operating handle assembly closely received on a valve operating stem for rotatably moving said stem between first and second positions, said operating handle comprising:

a handle member having a first handle mounting opening disposed therein for mounting said handle member on said stem;

a biasing member including a second mounting opening therein for mounting said biasing member on said stem in close spaced association with said handle member, said handle and biasing members including cooperating means for forcing opposite sides of said first and second mounting openings toward each other as said handle and biasing members are moved toward each other generally axially of said operating stem whereby opposed radial clamping forces are applied to opposite sides of said operating stem, said biasing member further including handle stops for precisely determining the amount of rotational movement of said stem through said handle member; and, a clamping member received on said stem and selectively movable axially therealong for forcibly moving said handle and biasing member toward engagement with each other.

18. The handle assembly as defined in claim 17 wherein said handle stops comprise downwardly depending spaced apart tabs integral with said biasing member adapted to engage positive stop members on a valve body for precisely limiting arcuate movement of said operating handle between two extreme positions.

19. An operating handle assembly closely received on a valve operating stem for rotatably moving said stem between first and second positions, said operating handle comprising:

a handle member having a first handle mounting opening disposed therein for mounting said handle member on said stem;

a biasing member including a second mounting opening therein for mounting said biasing member on said stem in close spaced association with said handle member, said handle and biasing members including cooperating means for forcing opposite sides of said first and second mounting openings toward each other as said handle and biasing members are moved toward each other generally axially of said operating stem whereby opposed radial clamping forces are applied to opposite sides of said operating stem, said first and second mounting openings further including means for cooperating with said stem to prevent relative rotation between said handle and biasing members and said stem; and, a clamping member received on said stem selectively movable axially therealong for forcing said handle and biasing members toward engagement with each other.

20. The handle assembly as defined in claim 19 wherein said force means is disposed on said handle member, said biasing member including an area thereon for engaging said force means.

21. The handle assembly as defined in claim 20 wherein said force means comprises a recessed area including aside wall in said handle member, said biasing member being received in said recess and acting against at least a portion of said side wall as said handle and biasing members are brought toward engagement with each other on said operating stem by said force member.

* * * * *